May 19, 1970  F. N. SCHWEND  3,513,441
VERIFICATION SYSTEM

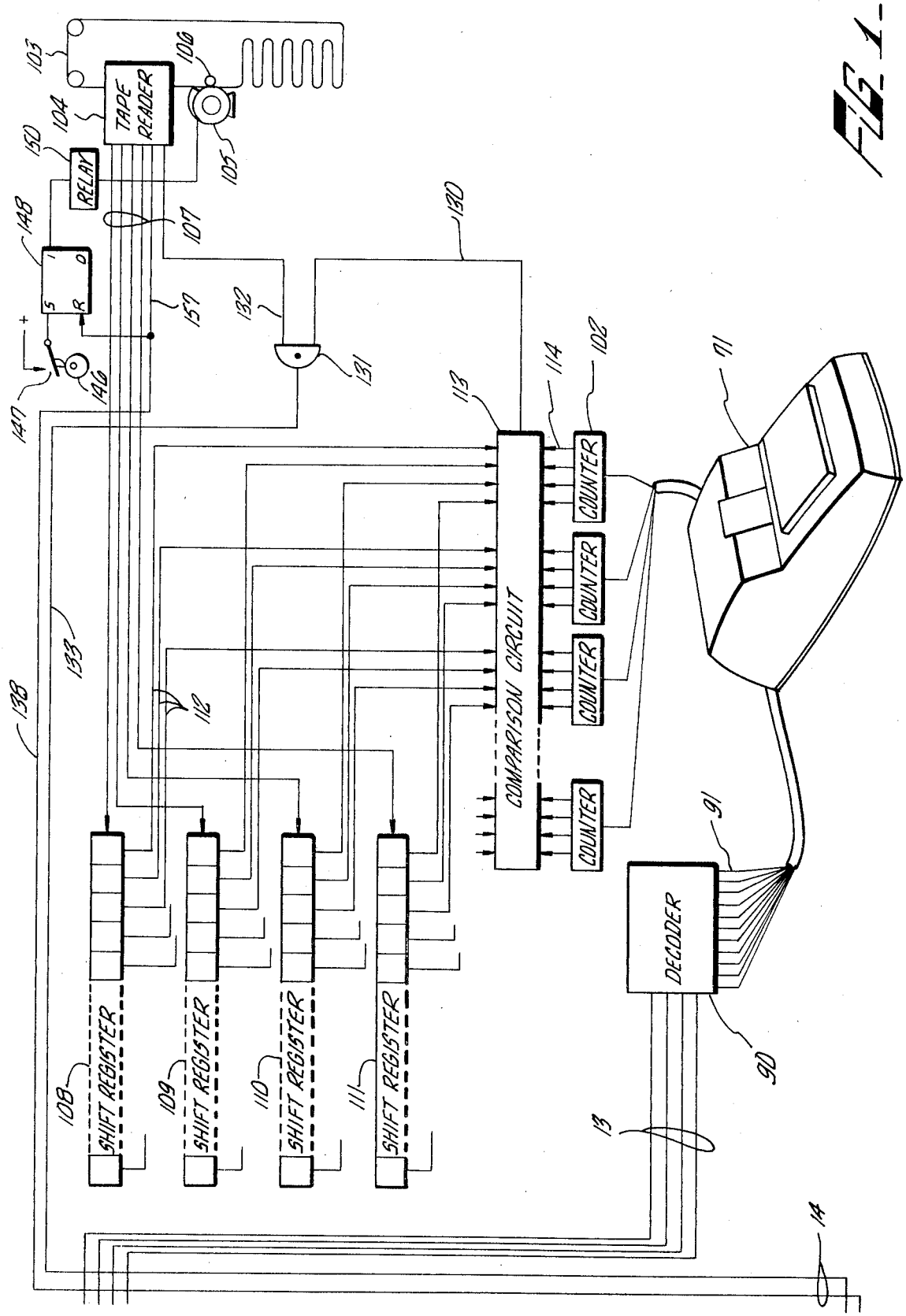

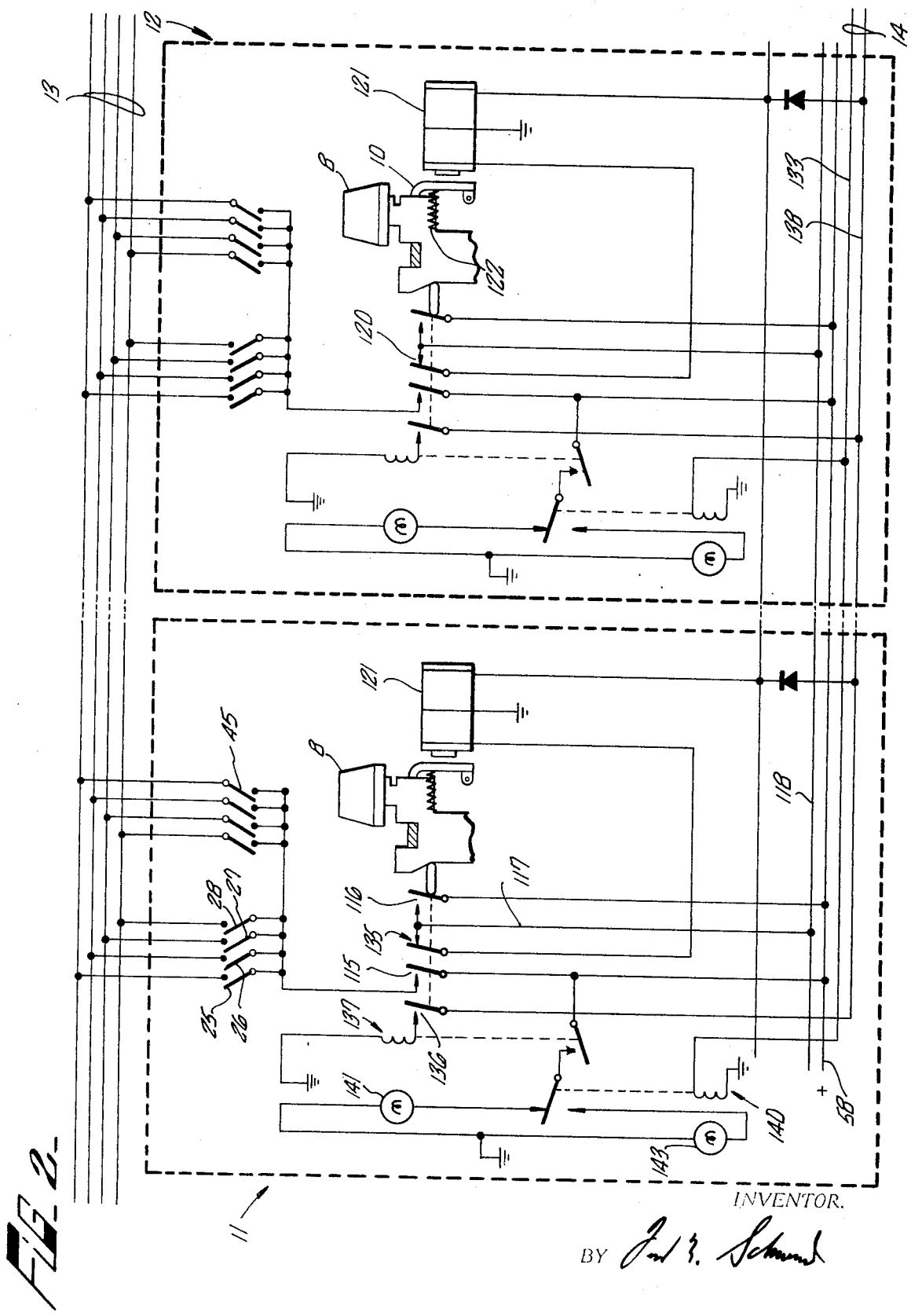

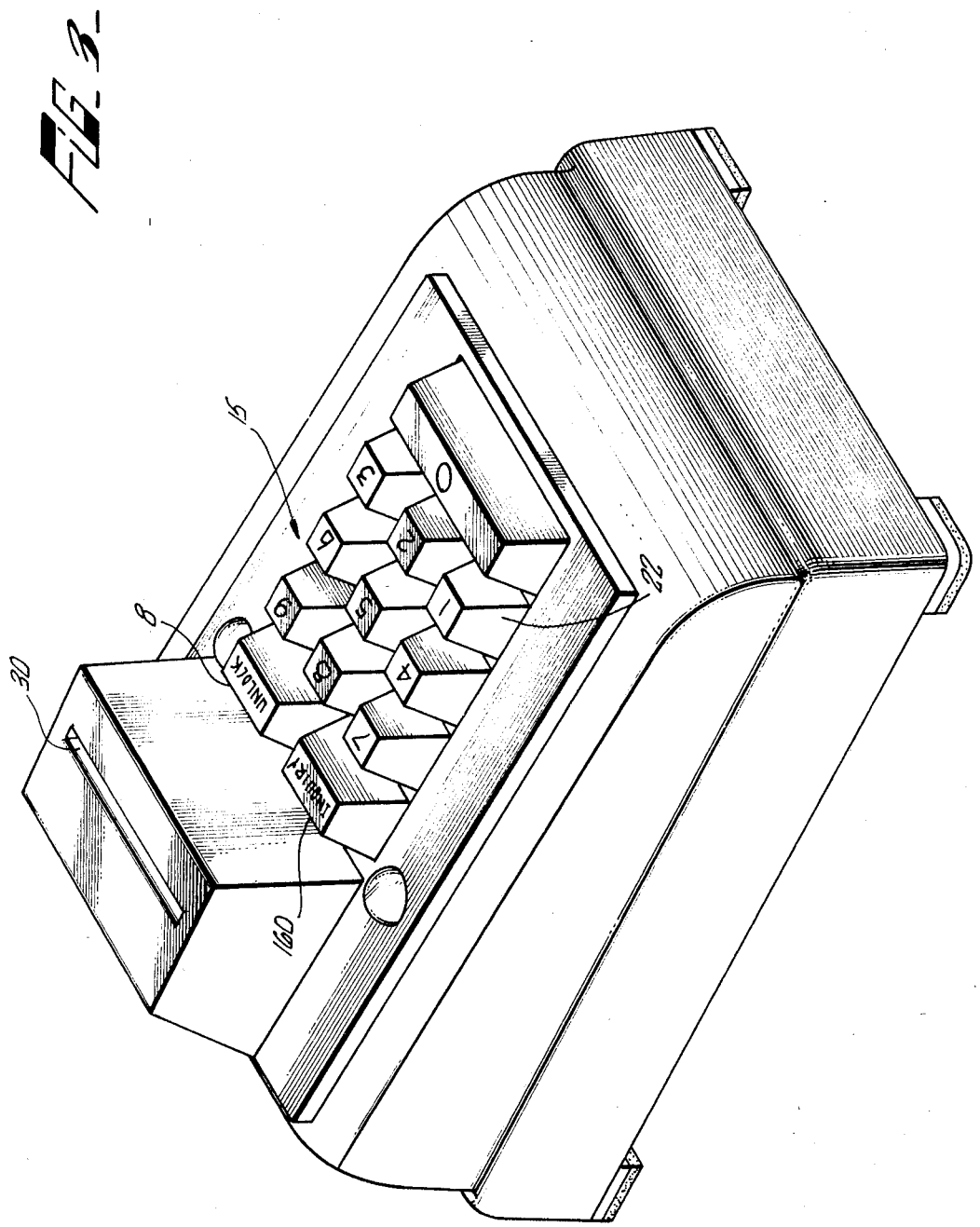

Filed Oct. 16, 1967  6 Sheets-Sheet 4

INVENTOR.
BY *F. N. Schwend*

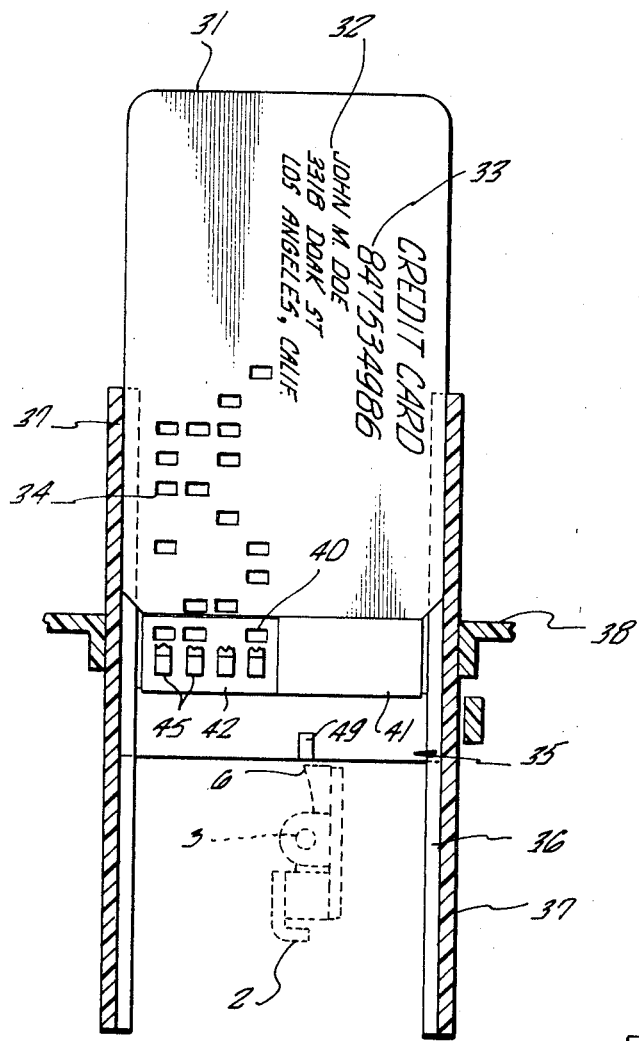
FIG. 8.
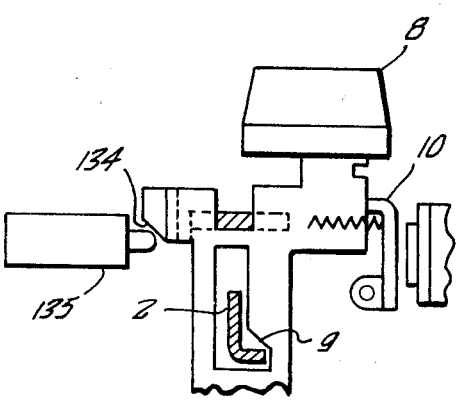
FIG. 9.
FIG. 6.

May 19, 1970 F. N. SCHWEND 3,513,441
VERIFICATION SYSTEM

Filed Oct. 16, 1967 6 Sheets-Sheet 6

INVENTOR.
BY *Fred N. Schwend*

United States Patent Office 3,513,441
Patented May 19, 1970

3,513,441
VERIFICATION SYSTEM
Fred N. Schwend, Arcadia, Calif., assignor to Clary Corporation, San Gabriel, Calif., a corporation of California
Filed Oct. 16, 1967, Ser. No. 675,430
Int. Cl. G06k 1/12, 3/00; H04q 9/00
U.S. Cl. 340—149                     1 Claim

ABSTRACT OF THE DISCLOSURE

A credit verification system using a credit card having a field of coded punched holes identifying a customer's credit account number in which the card is placed in a slot at any of several point-of-sale stations. Electrical sensing means senses the holes and transmits the number to a central processing station where the number is recorded and automatically compared with a series of unacceptable numbers registered on a magnetic tape. If a match is made, a signal indicating that fact is returned to the inquiring station. During inquiry from one station, other stations are rendered ineffective.

---

This invention relates to an information transmitting system and has particular reference to a system utilizing a credit card for verifying a credit or charge account to determine if the customer's account is in good standing.

Credit card systems are becoming more and more popular for purchasing different types of items and services on credit. However, such credit cards do not, in themselves, indicate if the customer's account is in good standing.

Heretofore, when a customer submitted a credit card to a sales person in a department store, airline ticket office or the like, for purchase of an item or service on credit, the sales person would generally telephone the customer's account number to a central office where credit files are kept and the files would be checked to determine the credit standing of the customer. This not only takes time but is susceptible to error and is a source of annoyance to the sales person. Accordingly, there is a tendency, especially when the sales person has a number of customers waiting for him, to omit such credit check.

A principal object of the present invention is to provide a credit verifying system utilizing a credit card, which system is easy to operate and takes minimum amount of time and effort on the part of the sales person.

Another object is to provide a credit verifying system of the above type which is completely automatic.

Another object is to provide a credit verifying system of the above type in which a record is made of each credit inquiry.

Another object is to provide a credit verifying system in which the customer's account number may be transferred to a verifying station either directly by automatically sensing a credit card or by means of a keyboard.

Another object is to provide a credit verifying system having a plurality of inquiry stations and a central verifying station in which a minimum number of lines are required to connect the inquiry station to the verifying station.

Another object is to render all others of a plurality of inquiry stations ineffective during operation of one of said stations.

The manner in which the above and other objects of the invention are accomplished will be readily understood on reference to the following specification when read in conjunction with the accompanying drawings, wherein:

FIGS. 1 and 2, taken together, are schematic views illustrating a credit verification system embodying one form of the present invention.

FIG. 3 is a perspective view of one of the inquiry units.

FIG. 6 is a transverse sectional view illustrating the "unlock" key.

FIG. 7 is a longitudinal sectional view of a data registering machine located at the verification station.

FIG. 8 is a transverse sectional view taken substantially along the line 8—8 of FIG. 4.

FIG. 9 is a sectional view of the speed governor.

In general, the credit verification system comprises a plurality of inquiry stations diagrammatically indicated at 11 and 12 in FIG. 2. Although only two are shown, any number may be employed. Such stations are located at the various points of sales in a department store, super market, airline ticket agency, etc., and are connected through two sets of electrical lines 13 and 14 to each other and to a central verification station shown in FIG. 1.

Figure 5:
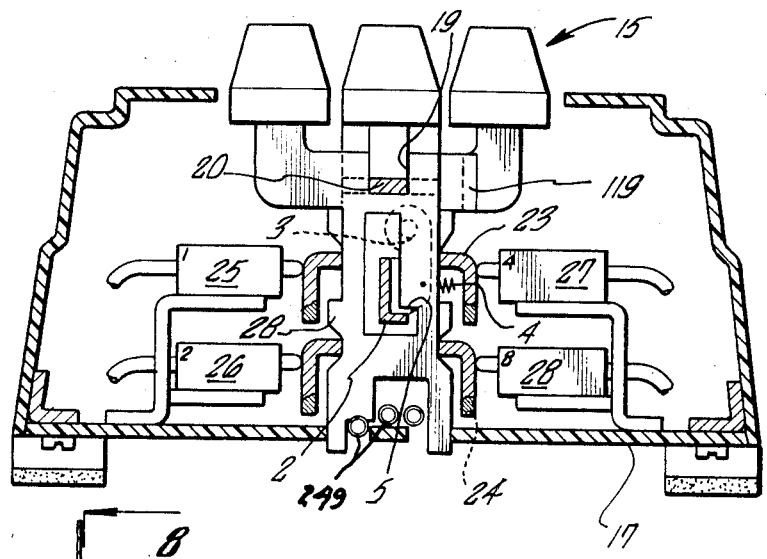
FIG. 5 is a transverse sectional view through an inquiry unit and is taken substantially along the line 5—5 of FIG. 4.

Each of the inquiry stations, i.e., 11 and 12, comprises a ten-key keyboard, generally indicated at 15 (FIGS. 3, 4 and 5), each key 22 of which has a keystem 16 slideably mounted at its lower end in a guide slot formed in a bottom plate 17. Each keystem also has a vertical slot 19 slideably embracing an upper guide bar 20 integral with vertical brackets 21 suitably secured to the bottom plate 17. Tension springs 249 extending under the various keys yieldably hold the same in their upper illustrated positions.

Certain of the keystems 16 are offset at their upper ends at 39 so that the tops of the keys 22 may be arranged in laterally extending rows, as seen in FIG. 3.

Four bails 23 extend along the various keystems 16 and are pivoted as at 24 in the brackets 21. The bails engage the plungers of respective normally open switches 25, 26, 27 and 28 which have spring elements, not shown, therein which yieldably hold the bails against the side edges of the various keystems.

Each keystem has one or more cam lobes 28 thereon effective upon depression of the respective key to rock one or more of the bails 23 and thus close the switches associated therewith. Such cam lobes are arranged according to a particular code which, in the present case, is based on the binary series. For example, the switch 25 is assigned the binary value "1"; switch 26, the binary value "2"; switch 27, the binary value "4"; and switch 28, the binary value "8." Thus, depression of the number "2" key would, for example, close the switch 26 only and depression of the number "7" key would close the switches 25, 26 and 27. The zero key is provided with two lower cams on opposite edges which are effective upon depression of such key to close switches 26 and 28. The switches 25 to 28 are electrically connected to respective ones of the four lines constituting the set 13.

Normally, the various numeral keys 22 are locked against depression by a latch 2 pivoted at opposite ends at 3 and held by a tension spring 4 in latching engagement with shoulders 5 on the various keystems 16.

The card 31 also has a field of punched holes 34 representing in coded form the account number 36. In this case, the holes are coded according to the binary series, each horizontal row of holes (as seen in FIG. 8) representing one digit of the account number.

A slide 35 of insulating material, preferably plastic, is guided vertically in slots 36 formed in guide members 37 integral with a keyboard cover 38 which is suitably attached to the bottom plate 17. The slide 35 has a laterally offset upwardly projecting portion 41, and a section 42 of this is reduced in thickness and extends in the plane of the inserted card 31. A row of holes 40 representing the binary equivalent of the decimal number "11" is formed in the section 42 in alignment with the field of holes 34, the purpose of which will be described later.

In line with the various vertical columns of holes in the credit card 31 and in section 42 of the slide are four flexible switch blades 45 which are connected through flexible leads 49 to respective ones of the lines in the set 13. The contact blades are carried by a block 46 of insulating material which is supported by a pivot pin 47. An arm 49 integral with block 46 is connected by pin and slot connection 50 to a three-armed lever 51 pivoted at 52. A compression toggle spring 53 extends between the lever 51 and a fixed stud 54 to normally hold the lever and block 51 in their positions illustrated in FIG. 4 wherein the contact blades are held out of engagement with the section 42 of the slide.

Normally, the slide 35 is blocked against depression and for this purpose it is provided with a projection 49 (see also FIG. 8) which overlies a blocking shoulder 6 formed on an extension 7 of the locking bail 2. However, upon depression of an "unlock" key 8 (FIGS. 1 and 6) a camming shoulder 9 thereon cams the locking bail 2 clockwise to release both the numeral keys and the slide 35. A spring pressed latch 10 becomes effective to latch the key 8 in depressed condition.

When a card 31 is inserted in the slot 30 and depressed downward to lower the slide 35 against the action of a tension spring 55 to a fully inserted position at the bottom of its travel, a projection 59 on the slide will engage a stud 58 on the lever 51 and thus rock the latter counterclockwise until the contact blades 45 engage the side of the card. The spring 53 will now act to maintain the contact blades in wiping contact with the card, and as downward pressure on the card 31 is released, the spring 55 acts to return the slide and card upward toward their illustrated retracted positions, causing the contact blades to wipe along the surface of the card and to project through the different holes 34 into engagement with a contact bar 57 which is suitably insulated from the rest of the unit and is adapted to be connected to a source of electrical power 58 (see also FIG. 2) through a normally open set of switch contacts 115, to be described later.

A speed governor generally indicated at 60, FIG. 9, is provided to regulate the speed of upward movement of the card 31. Such governor comprises a stationary cup-shaped friction element 61 which is located concentric to a rotatable shaft 62 carrying a hub 63 to which are attached the ends of a pair of diametrically opposed leaf springs 64 having friction shoes 65 attached to the opposite ends thereof.

The shaft 62 is driven by the slide 35 and for this purpose it carries a gear 66 meshing with the larger element of a compound gear 67, the smaller element of which meshes with a gear rack 68 formed integral with the slide 35.

Figure 4:
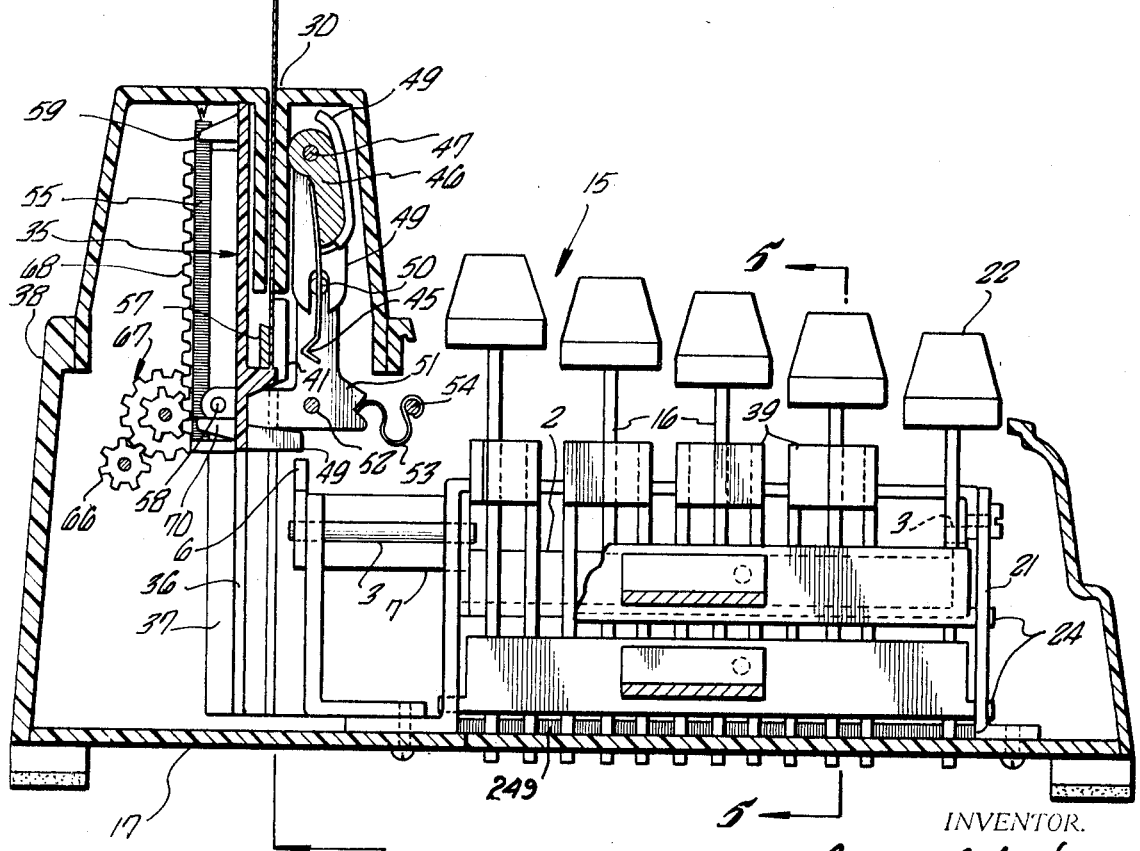
FIG. 4 is a longitudinal sectional view through an inquiry unit.

When the slide 35 approaches the upper limit of its travel, a projection 70 thereon engages the stud 58 to return the lever 51 and block 46 to their positions illustrated in FIG. 4.

Figure 1:
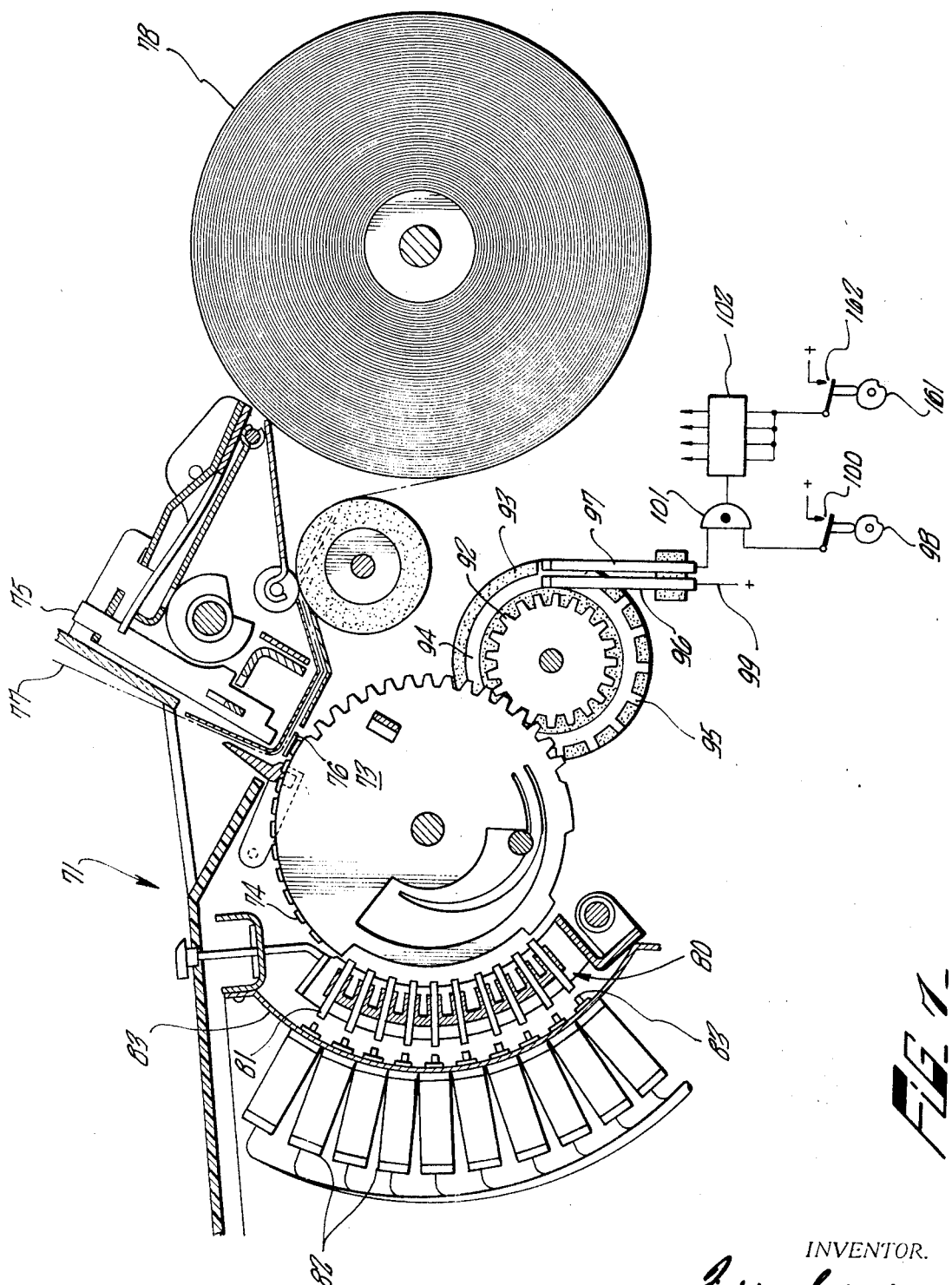

The verification station illustrated in FIG. 1 includes a data registering machine generally indicated at 71. Such machine is basically similar to the well known commercially available Addmaster Adding Machine. Reference is hereby made to the H. L. Clary et al. Pat. No. 3,132,532, issued on May 12, 1964, for details of such machine. Therefore, for the sake of brevity, only those portions which have been added to the machine or which form a part of the present invention will be described in detail herein. However, it is to be understood that the invention is not limited to the particular machine disclosed.

In general, the registering machine 71 comprises a plurality of independently rotatable denominationally arranged type sectors 73 (FIG. 7) carrying type sectors 74 ranging in value from "0" to "9." The sectors 73 cooperate with vertically movable print hammers 75 to transmit an imprint from different type characters 74, through a printing ribbon 76 and onto a paper tape 77 guided between the ribbon and the type hammers, from a supply roll 78.

A pin carriage 80 carrying a field of settable pins 81 is shiftable laterally of the machine in the manner disclosed in the above Clary et al. patent, to control the extent of clockwise movement of the different sectors 73. However, in lieu of a keyboard for setting the pins 81, a vertical row of solenoids 82 is provided, the latter being supported by a bracket 83. Each of the solenoids 82 carries an armature 83 effective, when such solenoid is energized, to set an aligned one of the pins 81 in position to limit clockwise movement of an aligned sector 73.

In order to set the various pins 81 of the pin carriage in accordance with the particular depressed ones of the keys 22 or in accordance with the digital values of the account number 36 on an inserted credit card, the set of lines 13 is connected to a binary-to-decimal converter circuit 90 of suitable well known construction, the outputs of which are connected in circuit with respective ones of the solenoids 82.

The machine 71 is cyclically operable by an electric motor, not shown, and operation of the same is initiated by energizing a conductor 91 representing the decimal value 11. Energization of the conductor 91 is effected upon passage of the row of holes 40 in the slide 35 past the contacts 45 which set up electrical signals on the set of conductors 13 representing the binary equivalent of the value 11.

Each of the sectors 73 meshes with a respective gear 92 integral with a disc 93 of insulating material which carries a concentric conductor strip 94 from which project spaced contacts 95. Wiper brushes 96 and 97 are arranged in wiping contact with the strip 94 and contacts 95, respectively. The contacts 95 are spaced to establish a circuit from a source of power 99 to the brush 97 once for each incremental advance of the associated sector 73.

When the machine 71 advances through the first half of its cycle, the sectors 73 are yieldably advanced clockwise until arrested by set ones of the pins 81 and during such advance a switch 100 is held closed by a cam 98 driven by the machine to open an "and" gate 101, permitting pulses generated by the contacts 95 to be applied to a four-stage binary counter 102, there being one such counter associated with each printing sector 73 of the machine.

Means are provided for automatically comparing an account number set up on the registering machine 71 with each of a number of disapproved or questionable account numbers stored in a memory unit. For this purpose, an endless magnetic tape 103 (FIG. 1) is provided on which are successively recorded the disapproved account numbers. These are preferably recorded in binary coded decimal form along four channels of the tape in a parallel-by-bit and serial-by-digit fashion. The tape is advanced through a suitable tape reader 104 by a tape feed motor 105 which drives the tape by means of a capstan roller 106.

Four of the output lines, i.e., 107, of the reader 104 successively register the different digits of each disapproved or questionable account number on the tape and such lines are connected as inputs to respective ones of four shift registers 108 to 111. Such registers each have a number of stages equal to the number of digits in each account number, i.e., nine.

Upon shifting of an account number from the tape reader into the shift registers, such number is applied output lines, i.e., 112, to input terminals of a comparison circuit 113 of conventional construction. Here the number is matched with the number registered in the counters 102 and for this purpose the output lines, i.e., 114, from the counters 102 are connected to matching input terminals of the comparison circuit. When a match occurs, an output signal is applied over line 130 to the input of an "and" gate 131. The latter is opened upon receipt of a "compare" command signal derived from an additional track on the tape 103 and transmitted via line 132 from the tape reader 104. Accordingly, a signal will be applied over line 133 (FIGS. 1 and 2) to a suitable indicating device at the inquiry station, as will be described in detail later.

Further describing the inquiry stations, each "unlock" key 8 (FIGS. 2 and 6) at each inquiry station has a camming shoulder 134 effective upon depression to throw a multi-pole, double throw switch 135 from its position shown in FIG. 2 to an alternate position to complete a circuit from power supply line 58, through contacts 115 to the key operated switches 25 to 28 and the credit card controlled switches 45. Also, contacts 116 of switch 135 close to complete a circuit from the power supply line 58, through lines 117 and 118 and thence through the normally closed contacts 120 of the switches associated with all other inquiry stations to one winding of a double wound electromagnet 121 at each such station. The latter operate to withdraw the associated latches 10 against the action of respective springs 122 to prevent latching down of keys 8. Therefore, the numeral keys and slides 35 at all inquiry stations other than the one currently being operated upon will be blocked against depression.

The operated switch 135 also closes contacts 136 connecting a slow release relay 137 to a line 138, the purpose of which will be described presently. The normally open contacts of relay 137 when closed connect the power supply line 58 to the blade of a second slow release relay 140, which blade is normally connected in circuit with an "approved" lamp 141 that indicates, when lit, that the customer's credit is approved. The relay 140 is connected to the above mentioned line 133 so that upon energization of the latter, its blade will be connected in circuit with a second "unapproved" lamp 143 which indicates, when lit, that the customer's credit is not approved.

Describing now the operation of the system, when a customer proffers his credit card to a sales person at any point-of-sale station, the latter depresses the key 8 which is held down by latch 10.

Switch 135 controlled by such key completes a circuit through the electromagnets 121 of all the other stations, thereby preventing use of such stations until the inquiry from the currently used station is completed. Upon insertion of the customer's credit card and release, the various rows of holes 34 in the card are successively sensed by the brushes 45 and signals representing the various digits of the customer's account number are successively transmitted over the set of lines 13 to set the corresponding pins 81 in the pin carriage of the registering machine 71.

As the credit card 30 approaches its retracted position, the brushes 45 sense the row of holes 40 in the slide 35, transmitting a cycle initiating signal to cause operation of the registering machine 71 so as to print the customer's account number and to set up such number in the counters 102 in binary coded decimal manner. At this time, a cam 146 (FIG. 1) closes a switch 147 to set a flipflop 148 to apply a signal to a suitable relay 150, causing operation of the tape feed motor 105. Accordingly, the various disapproved account numbers registered on the tape 103 will be successively transmitted to the shift registers 108 to 111 and compared with the number set up on the counters 102. If a match is made, indicating that the customer's credit is disapproved or questioned, a signal will be applied over lines 130 and 133 to energize each of the relays 140, connecting the lamps 143 in circuit with the normally open contacts of relays 137.

Upon readout of all of the account numbers on the tape 103, an "end of search" signal will be received from a separate track on the tape and will be transmitted over lines 157 and 138 to thus energize the relay 137 of the currently operated inquiry station and thus cause the "disapproved" lamp to be lit. Such lamp will remain lit for a period of time depending upon the release time of the relays 137 and 140.

If no match is found between the number registered in the counters 102 and those on the tape 103, the relay 140 will not be energized and accordingly a circuit will be completed through the "approved" lamp 141, indicating approval of the customer's credit.

Concurrently with energization of the relay 137, the second winding of each of the magnets 121 will be energized causing release of the latched down key 8. However, such complete release will occur only after the associated relay 137 has been energized. Also, concurrently with energization of relay 137, a cam 161 (FIG. 7) driven by the machine 71 closes a reset switch 162 to apply a reset signal to all of the counters 102. Therefore, the system will be returned to its original condition permitting an inquiry to be made at any of the other inquiry stations.

In the event the customer does not have his credit card with him at the time of the sale but knows his account number, such account number can be entered in the keyboard, after which an "inquiry" key 160 is depressed. The latter has lobes 28 on the keystem thereof capable of closing the switches 25, 26 and 28 to initiate operation of the machine 71 in the same manner that the row of holes 40 on the slide 35 effects such operation.

Following transmission and inquiry of a customer's account number, the amount of a sales transaction may also be recorded by the machine 71. In this event, the key 8 is again depressed, the amount is set up on the keys 22 and the key 160 is depressed causing a cycle of operation of the machine to print the amount directly below the customer's account number. Although a search and compare operation will ensue in the manner disclosed above, this will have no effect on the recording of the amount.

Other information, such as the number of the sales department or person, the code numbers of the goods sold, etc., may also be transmitted through the keyboard and recorded.

Although the invention has been described in detail and certain specific terms and languages have been used, it is to be understood that the present disclosure is illustrative rather than restrictive and that changes and modifications may be made without departing from the spirit or scope of the invention as set forth in the claim appended hereto.

Having thus described the invention, what is desired to be secured by United States Letters Patent is:

1. In a verification system,
the combination comprising a plurality of inquiry stations,
a verifying station,
said verifying station comprising a printer,
means including an indexable stop pin carriage for controlling said printer to print amounts corresponding to amounts set up in said pin carriage,
remote control means including switch devices at each of said inquiry stations for setting up an amount in said pin carriage indicative of an identification number and for indexing said pin carriage,
means controlled by said first mentioned means for emitting signals indicative of said identification number,
means including a memory unit for registering a plurality of identifying numbers and for emitting signals indicative of said identifying numbers,
means for comparing said signals indicative of said identification number with said signals indicative of said identifying numbers,
an alarm device at each of said stations, and means controlled by said comparing means when said signals indicative of said identification number correspond to said signals indicative of a said identifying number for operating the said alarm device at the said station whereat said switch devices are operated.

References Cited

UNITED STATES PATENTS

| | | | |
|---|---|---|---|
| 2,836,809 | 5/1958 | MacNeill | 340—365 |
| 3,035,764 | 5/1962 | Beman | 235—61.9 |
| 3,258,747 | 6/1966 | Plate. | |
| 3,296,369 | 1/1967 | Clark et al. | 340—365 XR |
| 3,315,230 | 4/1967 | Weingart | 340—149 |
| 3,025,498 | 3/1962 | Blodgett. | |

DONALD J. YUSKO, Primary Examiner

U.S. Cl. X.R.

235—61.9